United States Patent
Jeong et al.

(10) Patent No.: US 12,530,700 B2
(45) Date of Patent: Jan. 20, 2026

(54) SYSTEM AND METHOD FOR DETERMINING BLOCKCHAIN-BASED CRYPTOCURRENCY CORRESPONDING TO SCAM COIN

(71) Applicant: DIGITAL ASSET EVALUATION KOREA, Seoul (KR)

(72) Inventors: Hak Su Jeong, Gyeonggi-do (KR); Byung Gue Kim, Seoul (KR)

(73) Assignee: DIGITAL ASSET EVALUATION KOREA, Seoul (KR)

( * ) Notice: Subject to any disclaimer, the term of this patent is extended or adjusted under 35 U.S.C. 154(b) by 124 days.

(21) Appl. No.: 18/469,861

(22) Filed: Sep. 19, 2023

(65) Prior Publication Data

US 2024/0029082 A1 Jan. 25, 2024

Related U.S. Application Data

(63) Continuation of application No. PCT/KR2022/010652, filed on Jul. 20, 2022.

(30) Foreign Application Priority Data

Jul. 6, 2022 (KR) .......................... 10-2022-0083063

(51) Int. Cl.
*G06Q 30/018* (2023.01)

(52) U.S. Cl.
CPC .............................. *G06Q 30/0185* (2013.01)

(58) Field of Classification Search
None
See application file for complete search history.

(56) References Cited

U.S. PATENT DOCUMENTS

| | | | |
|---|---|---|---|
| 2015/0170112 A1* | 6/2015 | DeCastro | G06Q 20/367 |
| | | | 705/39 |
| 2016/0071108 A1* | 3/2016 | Caldera | G06Q 20/065 |
| | | | 705/75 |

(Continued)

FOREIGN PATENT DOCUMENTS

| | | | | |
|---|---|---|---|---|
| CN | 109658245 A | * | 4/2019 | G06Q 40/06 |
| KR | 20200082321 A | * | 7/2020 | G06Q 40/06 |
| WO | WO-2019106659 A1 | * | 6/2019 | G06Q 40/00 |

OTHER PUBLICATIONS

Bian, S., Deng, Z., Li, F., Monroe, W., Shi, P., Sun, Z., et al. (2018). IcoRating: A Deep-Learning System for Scam ICO Identification. arXiv:1803.03670 [cs.CL] (Year: 2018).*

(Continued)

*Primary Examiner* — Andrew B Whitaker
(74) *Attorney, Agent, or Firm* — Guntin & Gust, PLC; Miyoung Shin

(57) ABSTRACT

Embodiments relate to systems and methods for determining a blockchain-based cryptocurrency corresponding to a scam coin, including a service server that includes a data acquisition unit and a scam determining unit. The data acquisition unit is further configured to access a prespecified online space through a communication network and acquire project data including a first type of project data. The scam determining unit is configured to determine whether a target coin is a scam coin by analyzing the acquired data and including a first determining unit configured to determine whether the target coin is a scam coin on the basis of the first type of project data.

9 Claims, 20 Drawing Sheets

(56) References Cited

U.S. PATENT DOCUMENTS

| | | | |
|---|---|---|---|
| 2020/0175501 A1* | 6/2020 | Vange | G06Q 20/3676 |
| 2020/0311790 A1* | 10/2020 | Keren | G06Q 20/4016 |
| 2020/0311816 A1* | 10/2020 | Calvin | H04L 9/50 |
| 2022/0327529 A1* | 10/2022 | Williams | H04L 9/50 |
| 2022/0343330 A1* | 10/2022 | Suh | G06Q 20/382 |
| 2022/0366021 A1* | 11/2022 | McCarthy | H04L 63/12 |

OTHER PUBLICATIONS

IcoRating (Year: 2018).*

"Guide to Xangle XCR 2.0: What is XCR and how does it work?", Dec. 1, 2021, https://xangle.io/announcement/list?category=all, (accessed Mar. 22, 2023) and English translation (24 Pages).

"International Search Report for PCT/KR2022/010652", Jul. 6, 2022, 3 Pages.

"Scam coins, how do you distinguish them?", Dec. 15, 2021, https://upbitcare.com/academy/education/coin/80, (accessed Mar. 22, 2023) and English translation (7 Pages).

Bae, Yu-Jin, et al., "Clustering For Detecting Ethereum-Based Scam Coins", Korea Institute of Information Technology Next Generation Security Leader Training Program, Nov. 4, 2021, http://kips.or.kr/bbs/confn/article/2009 (accessed Mar. 22, 2023) and English translation (15 Pages).

Kim, Sora, "A site that ranks cryptocurrencies based on the number of GitHub commits appears.", Jan. 31, 2018, https://www.getnews.eo.kr/news/articleView.html?idx 5 no=47361, (accessed Mar. 22, 2023) and English translation (5 Pages).

Kwon, Soon-Woo , "'E grade? It's a scam!!' Establishment of standards for distinguishing normal coins from fraudulent coins", Korea Virtual Asset Valuation Certification Fraud Coin Classification Standard Thesis Certification, Feb. 8, 2022, https://news.mtn.co.kr/news-detail/2022020811293725475, (accessed Mar. 22, 2023) and English translation (7 Pages).

* cited by examiner

FIG.3 scilla

Scilla - A Smart Contract Imtermediate Level Language ocaml    smart-contracts    blockchain    verification    zilliqa    scilla ○ OCaml    ⚖ GPL-3.0    ⑂ 53    ☆ 165    ⊙ 89 (1 issue needs help)    ⇵ 9    Updated 6 hours ago

--- snapshot-hub snapshot-hub in rest API

○ TypeScript    ⑂ 0    ☆ 0    ⊙ 0    ⇵ 0    Updated 9 hours ago

--- snapshot

Forked from balancer-labs/snapshot
Off-chain gasless multi-governance client. Join us on Discord
https://discord.snapshot.page ○ Vue    ⚖ MIT    ⑂ 134    ☆ 0    ⊙ 0    ⇵ 0    Updated 9 hours ago

---

Zilliqa

Zilliqa is the world's first high-throughput public blockchain platform - designed to scale to thousands of transactions per second.

Zilliqa

○ C++    ⚖ GPL-3.0    ⑂ 216    ☆ 908    ⊙ 83 (1 issue needs help)    ⇵ 22    Updated 10 hours ago

--- dev-portal

Documentation for Zilliqa developer

○ GavaScript    ⚖ GPL-3.0    ⑂ 13    ☆ 4    ⊙ 2    ⇵ 1    Updated 14 hours ago

FIG. 6

| Q is:issue is:open | ◇ Labels (22) | ♦ Milestones (0) | New issue |

⊙ 83 Open ✓ 225 Closed

⊙ Stratum (enhancement)
2374 opened yesterday by frode88

⊙ Invalid contract and/or its invocations when deployed to Isolated Server (bug)
2371 opened 6 days ago by rockacola ⊙ [FEATURE REQUEST] Schnorr signature verification fail (enhancement)
2368 opened 13 days ago by xizho10

⊙ [FEATURE REQUEST] Provise the ability to generate the merkle proof for a transaction? (enhancement)
2356 opened 18 days ago by zhiqizngxu ⊙ Hi, How can I join the IP white list?
2344 opened 24 days ago by liuxh-go ⊙ How about an ordinary non-mining node?
2343 opened 24 day ago by liuxh-go ⊙ [BUG] /usr/local/bin/zilliqa: cannot execute binary file (bug)  0 of 1
2304 opened on 17 Oct by atomlab ⊙ Enabling some endpoint to track initial syncup progress (enhancement)
2181 opened on 21 Aug by ksemaev

FIG.7

⑂ 370 branches   ♡ 100 tags

FIG. 8

| ⛙ Pull requests ㉒ | ⓞ Actions | 🗒 Projects ② | 🕮 Wiki | ⓞ Security | ⌃ Insights | | |
|---|---|---|---|---|---|---|---|
| 🔍 is:pr is:open | | | | | ◇ Labels ㉒ | ⟁ Milestones ⓪ | New pull request |

⛙ 22 Open ✓ 2,042 Closed

⛙ [master] Fix dm3 for commit failed node catch up up with consensus ✓ (Ready)
   #2361 opened 15 days ago by kaikwaliu • Changes requested  ▤ 3 of 4          ⊛    ▢ 6

⛙ [master] Add option to dump contract code for data_migrate  ✓ (Ready)
   #2359 opened 16 days ago by kaikwaliu • Changes requested  ▤ 1 of 5          ⊛    ▢ 8

⛙ Refactoring GetAccount for better mutex coverage  ✓ (Ready)
   #2357 opened 18 days ago by kaikwaliu • Review required  ▤ 4 of 5            ⊛

⛙ [master] Example of how to extract all contract code from persistent storage  ✕
   #2355 opened 18 days ago by jlcnn • Draft ⛙ [master] Remove GETSTARTPOW for syncing, non-sharded miners  ✓ (Ready)
   #2337 opened 28 days ago by ansnunez • Approved  ▤ 0 of 5                    ⚙    ▢ 1

⛙ 6.4 + IsoServerFixes  ✓ (Ready)
   #2252 opened on 28 Sep by KaustubhShamshery • Draft  ▤ 1 of 5                ⊛

⛙ Bring transaction distribution earlier for shard  ✓ (Ready)
   #2238 opened on 22 Sep by kaikwaliu • Changes requested  ▤ 3 of 4            ⊛    ▢ 14

⛙ [WIP] Revised pBFT consensus with txn processing  ✓ (in-progress)
   #2216 opened on 11 Sep by sasndipbheir • Review required  ▤ 2 of 5           ⚙    ▢ 1

FIG. 9A

[master] Fix dm3 for commit failed node catch up with consensus #2361    [New issue]

🗣 Open  kaikawaliu wants to merge 1 commitinto [master] from [fix/dm3]

| 🗨 Conversation 6 | ◇ Commits 1 | ☑ Checks 3 | 🗎 Files changed 7 |   +28 −9

--- kaikawaliu commented 15 days ago ·edited ▾   (Contributor)  ···

Description

Fixing deprecated dm3 test due to timing issue. After this fix, a DS node missing MBs can replay the consensus with the patch-up message from leader and proceed to the next epoch.

Backward Compatibility

☐ This in not a breaking change
☑ This in a breaking change

Review Suggestion

Status

Implementatino
☑ ready for review

Integration Test(Core Team)
☑ small-scale cloud test

---

Reviewers
👥 ansnunez
🚚 sandipbhoir
🏠 chetan-zilliqa

Requested changes must be addressed to merge this pull request.

Assignees
🌐 kaikawaliu

Labels
(Ready)

Projects
📋 Core
    PRs needing review

Milestone
No milestone

Linked issues
Successfully merging this pull request may close these issues.

---

🌐 kaikawaliu added the (Ready) label 15 days ago

| VERIFICATION GRADE / JUDGMENT ITEM | A | B | C | D | E |
|---|---|---|---|---|---|
| PROJECT STORAGE (STORAGE ACTIVATION PREPARATION PERIOD) | 0~1 Hours Age | 0~24 Hours Age | 1day~30day age | 1month~12month | 1 years~ |
| PIN REPOSITORY | 300 Over | 300 Under | 100 Under | 50 Under | 10 Under |
| FORK (FORK) | 10,001 Over | 10,000 Under | 1,000 Under | 100 Under | 10 Under |
| ATTENTION (STAR) | 10,001 Over | 10,000 Under | 5,000 Under | 1,000 Under | 100 Under |
| COMMIT | 10,001 Over | 10,000 Under | 5,000 Under | 1,000 Under | 100 Under |
| BRANCH | 300 Over | 300 Under | 100 Under | 50 Under | 10 Under |
| TAG | 300 Over | 300 Under | 100 Under | 50 Under | 10 Under |
| PROJECT ISSUE | 300 Over | 300 Under | 100 Under | 50 Under | 10 Under |
| MASTER BRANCH (PULL REQUEST) | 61 Over | 60 Under | 40 Under | 20 Under | 5 Under |
| PROJECT PANEL/ OVERVIEW | 11 Over | 10 Under | 5 Under | 2 Under | 0 |

SYSTEM AND METHOD FOR DETERMINING BLOCKCHAIN-BASED CRYPTOCURRENCY CORRESPONDING TO SCAM COIN

CROSS-REFERENCE TO RELATED APPLICATION(S)

The present application is a continuation of and claims the benefit of priority to PCT Patent Application No. PCT/KR2022/010652 filed Jul. 20, 2022, which claims priority to Korean Patent Application No. 10-2022-0083063 filed on Jul. 6, 2022, the disclosures of which are hereby incorporated herein by reference in their entirety.

FIELD OF THE DISCLOSURE

Embodiments of the present disclosure relate to a system and method for determining whether a blockchain-based coin corresponds to a scam coin.

BACKGROUND

Cryptocurrency is a digital currency created on the basis of a blockchain using cryptography in a distributed environment and is one function in which only a payment function is highlighted among various functions of a blockchain. A blockchain basically has a community function and also has a communication function, a transaction function, an architecture function, and the like. Particularly, among the many functions of cryptocurrency, the function of currency of using a ledger to make payments is the most actively studied. Lately, numerous coins having various functions of currency are being issued.

Ledgers are taken as more reliable means of transaction than existing means of transaction on the basis of centralized computer systems at financial institutions and the like. Cryptocurrency has specificity and exclusive controllability in that a unique identification number is given and a transaction is completed only when the owner signs with a private key. For this reason, cryptocurrency has been recognized for its property value and is already becoming a means or medium of transaction. Since major domestic and foreign institutional investors have recently been investing in cryptocurrency and ordinary investors are also considering cryptocurrency as the last asset for achieving economic wealth or as a hedge against currency depreciation, cryptocurrency is increasingly being recognized for its value as an asset over time.

However, with market funds diverted to cryptocurrency, there are attempts to use cryptocurrency as a means to achieve negative goals rather than positive ones. Scam coins are a prime example of this. A scam coin is a coin for deceiving others with content different from the white papers or other public facts.

Unlike the market of securities such as stocks, the coin market is highly likely to be damaged by scam coins because the regulation and supervision of coins listed on the exchange are relatively lax. Therefore, it is necessary to protect market participants from scam coins.

SUMMARY

The present disclosure is directed to providing a system and method for determining whether a blockchain-based cryptocurrency corresponds to a scam coin using a prespecified verification guide.

One aspect of the present disclosure provides a system for determining a blockchain-based cryptocurrency corresponding to a scam coin, the system including a service server connected to a communication network. The service server includes a data acquisition unit configured to access a prespecified online space through the communication network and acquire project data including a first type of project data and a scam determining unit configured to determine whether a target coin is a scam coin by analyzing the acquired data and including a first determining unit configured to determine whether the target coin is a scam coin on the basis of the first type of project data. The data acquisition unit may further acquire one or more of a second type of project data and a third type of project data.

In at least one variant, the scam determining unit may further include one or more of a second determining unit configured to determine whether the target coin is a scam coin on the basis of the second type of project data and a third determining unit configured to determine whether the target coin is a scam coin on the basis of the third type of project data.

In another variant, the first type of project data may include information on one or more judgment items among project storage information, project popularity information, project code change information, project problem information, branch information, tag information, master branch information, and smart contract information.

In further another variant, the first determining unit may be configured to calculate verification grades for a first type of judgment items by applying the first type of project data for the target coin to a preset verification guide and determine whether the target coin is a scam coin on the basis of the calculated verification grades for the first type of judgment items. The verification guide may include a plurality of verification grades classified by values of first type judgment items that may be included in the first type of project data. The verification grade to which scam coins belong is a lower level than the verification grade to which other non-scam coins belong. A verification grade of a project storage item is defined according to a storage activation time. The verification grade to which the target coin with a relatively long storage activation time belongs is a lower grade than the verification grade to which another coin with relatively short storage activation times belongs.

In another variant, the first determining unit may select a first type of judgment item having a grade lower than or equal to a threshold grade among the plurality of verification grades calculated for the first type of judgment items and determine whether the target coin corresponds to a scam coin on the basis of the selected first type of judgment item.

In another variant, the first determining unit may calculate a representative verification grade of the target coin on the basis of the verification grades for the judgment items and determine the target coin as a scam coin when the representative verification grade is a low grade lower than or equal to the threshold grade, and at least one of a first weight for a project popularity item and a second weight for a code change item among weights for the judgment items used for calculating the representative verification grade on the basis of a weighted average may have a higher weight value than other weights.

In another variant, the first determining unit may calculate a verification grade for a project code change item using the verification guide and modify the calculated verification grade for the code change item according to whether a commit message includes content of a commit operation.

In another variant, the data acquisition unit may further acquire one or more other types of project data among a second type of project data and a third type of project data regarding the target coin which is not determined to be a scam coin by the first determining unit.

In another variant, the scam determining unit may analyze the second type of project data or the third type of project data regarding the target coin which is not determined to be a scam coin by the first determining unit, and redetermine the target coin as a scam coin when the target coin is determined to be a scam coin. The scam determining unit, for the target coin not determined as a scam coin in step (S100), may be analyze the project data of the second type or the third type to further determine whether the target coin corresponds to the scam coin; and finally determine the target coin as a scam coin when the target coin is determined to be a scam coin as a result of analyzing projector data of the second type or the third type of the target coin.

In another variant, the second type of project data may include information on one or more judgment items among a foundation office item, a foundation employee item, a relationship item between a foundation headquarters and a domestic organization, a representative foundation number item, a representative homepage item, a white paper of the target coin, and an official foundation account number item. The third type of project data may include information on one or more judgment items among a registered foundation type, a prespecified authentication policy introduction item, a personal information protection item, and a money tracking solution development item.

In another variant, the second determining unit may determine whether each of the second type judgment items has an item value and determine whether the target coin corresponds to a scam coin using second type judgment items having an item value. To determine whether the garget coin corresponds to the scam coin, the second determining unit may calculate a first judgment score on the basis of the second type judgment items having an item value and determine that the target coin corresponds to a scam coin when the calculated first judgment score is a preset threshold score or less.

A system according to an aspect of the present disclosure can determine whether a blockchain-based cryptocurrency corresponds to a scam coin using a prespecified verification guide.

Effects of the present disclosure are not limited to those described above, and other effects which have not been described will be clearly understood by those of ordinary skill in the art from the claims.

BRIEF DESCRIPTION OF THE DRAWINGS

To clearly describe the technical solutions of embodiments of the present disclosure or conventional art, drawings required in the description of the embodiments are briefly described below. It should be understood that the following drawings are only for the purpose of describing the embodiments of this specification and not for the purpose of limitation. In addition, for clarity of description, the following drawings may show some elements to which various modifications, such as exaggeration, omission, and the like, are applied.

FIG. 3 depicts an illustrative example of a non-limiting embodiment of a webpage showing coin storage activation states according to an experiment of the present disclosure.

FIG. 6 depicts an illustrative example of a non-limiting embodiment of a webpage showing project issue information according to an experiment of the present disclosure.

FIG. 7 depicts an illustrative example of a non-limiting embodiment of an area of a webpage showing branch and tag information according to an experiment of the present disclosure.

FIG. 8 depicts an illustrative example of a non-limiting embodiment of a webpage showing master branch information according to an experiment of the present disclosure.

FIGS. 9A to 9C depict illustrative examples of a non-limiting embodiment of webpages showing individual work details of a master branch according to an experiment of the present disclosure, where:

FIG. 9A depicts one example of individual work details of the master branch including content of individual work, a code change, and a file modification;

FIG. 9B depicts a code change including commit information recorded in a pull request due to the master branch work; and FIG. 9C depicts a file modification including files changed information due to the master branch work.

FIG. 10A depicts one example of the project management information; and

FIG. 10B depicts another example of the project management information.

FIG. 11A depicts overview of the project management information;

FIG. 11B depicts contribution of the project management information;

FIG. 11C depicts commit activity changed over time; and

FIG. 11D depicts additions and deletions over the lifetime of a project.

FIG. 12 depicts a verification guide according to an embodiment of the present disclosure.

DETAILED DESCRIPTION

Figure 1:
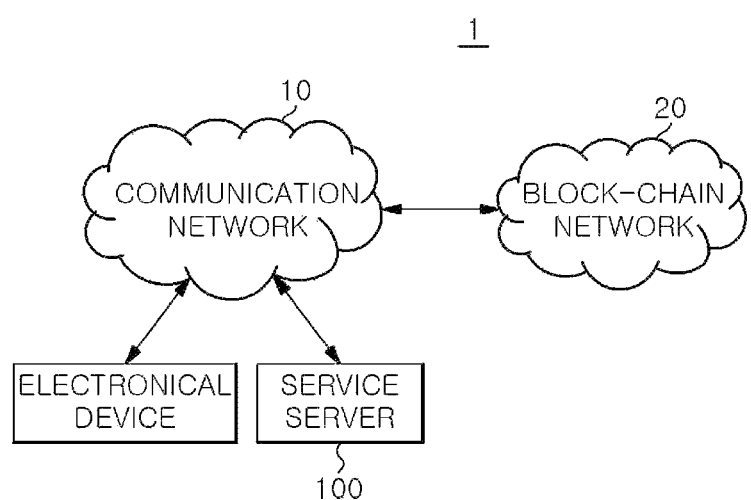
FIG. 1 depicts a configuration diagram of a system for determining a blockchain-based cryptocurrency corresponding to a scam coin according to an aspect of the present disclosure.

Hereinafter, embodiments of the present disclosure will be described in detail with reference to the drawings.

However, this is not intended to limit the present disclosure to specific embodiments, and it is to be understood that the present disclosure includes various modifications, equivalents, and/or alternatives of the embodiments of the present disclosure. In describing the drawings, like reference numerals may indicate like components.

In the present specification, the expressions "have," "may have," "include," "may include," and the like refer to the existence of a corresponding feature (e.g., a component including a numeral, a function, an operation, a step, a part, an element, a component, and/or the like) and do not exclude the existence or addition of additional features.

When it is mentioned that a first component is "coupled" or "connected" to a second component, it should be construed that the first component may be directly coupled or connected to the second component or there may be an intervening component. On the other hand, when it is mentioned that a component is "directly coupled" or "directly connected" to another component, it should be construed that there is no intervening component.

As used herein, the terms "first," "second," "primary," and "secondary" may be used to describe various components regardless of order and/or importance and do not limit the corresponding components. The terms may be used for distinguishing a component from another. For example, a first component and a second component may indicate different components regardless of order or importance.

The expression "configured (or set) to" used in the present specification may be interchangeably used with, for example, "suitable for," "having the capacity to," "designed to," "adapted to," "made to," or "capable of" according to circumstances. The term "configured (or set) to" may not necessarily mean "specifically designed to" in hardware. Rather, in some circumstances, the expression "device configured to" may mean that the device "can perform" an operation together with other devices or parts. For example, the phrase "processor configured (or set) to perform B and C" may mean a dedicated processor (e.g., an embedded processor) for performing the operations or a generic-purpose processor (e.g., a central processing unit (CPU) or application processor) that may perform the operations by executing one or more software programs stored in a memory device.

In this specification, coins correspond to digital cryptocurrency based on the blockchain technology and are cryptocurrency for which there is a separate and independent blockchain network. Coins are unique expenses of a smart contract platform and are distinguished from tokens which are generated as derivatives of a primary blockchain.

A project is a series of projects for developing a solution to a specific problem on the basis of the blockchain technology. Private blockchain solutions produced by a specific company, public blockchain solutions piloted by a small number of developers, decentralized applications (Dapps), and the like are also projects in a broad sense. Not all projects issue coins or tokens, but already issued coins may be byproducts produced in the course of a specific project.

FIG. 1 is a configuration diagram of a system for determining a blockchain-based cryptocurrency corresponding to a scam coin according to an aspect of the present disclosure.

Referring to FIG. 1, the system for determining a blockchain-based cryptocurrency corresponding to a scam coin (hereinafter, "scam coin determining system 1") is configured to provide a service for distinguishing a scam coin from among blockchain-based cryptocurrencies and providing the distinguishment result. The scam coin determining system 1 includes a service server 100 for distinguishing scam coins.

The scam coin determining system 1 may be configured to interoperate with a blockchain network 20.

In various embodiments, the system 1 may be entirely hardware or entirely software or may partially have hardware aspects and software aspects. For example, the system may collectively include hardware having a data processing capability and operating software for running the hardware. In this specification, the term "unit," "module," "device," "system," or the like is intended to indicate a combination of hardware and software run by the hardware. For example, the hardware may be a computing device including a CPU, a graphic processing unit (GPU), or another processor. Also, the software may be a process in execution, an object, an executable file, a thread of execution, a program, and the like.

In various embodiments, the service server 100 is configured to acquire information related to a target coin which will be determined to be a scam coin or not through a communication network 10 or a user input and determine whether the target coin is a scam coin by analyzing the acquired information in one or more aspects.

In some embodiments, the communication network 10 may be that is usable by a user of a node participating in the blockchain network 20 to readily access information on a coin used in the blockchain network 20, such as the Internet or the like. In some embodiments, the blockchain network 20 is a generally accessible open network. The communication network 10 provides a wired/wireless telecommunication path in which an electronic device of a user terminal or an online space and the service server 100 can exchange data. The communication network 10 is not limited to a communication method based on a specific communication protocol, and an appropriate communication method may be used for an implemented embodiment. For example, when the system is constructed based on the Internet protocol (IP), the communication network 10 may be implemented as a wired and/or wireless Internet network. When the service server 100 and the user terminal are implemented as mobile communication terminals, the communication network 10 may be implemented as a wireless network such as a cellular network or a wireless local area network (WLAN).

In some embodiments, the electronic device of the user terminal is a client terminal device that may be provided with a judgment result and includes at least one processor for processing data, a memory for storing data, and a communication unit for transmitting or receiving data. The electronic device may be, for example, a laptop computer, a notebook computer, another computing device, a tablet computer, a cellular phone, a smartphone, a smart watch, smart glasses, a head mount display (HMD), another mobile device, or a wearable device.

In some embodiments, the service server 100 is a plurality of computer systems or computer software implemented with a network server. Here, the network server is a computer system and computer software (a network server program) that receive a work request in connection with a sub-device for communicating with another network server through a computer network, such as a private intranet or the Internet, perform the work, and provide the result. However, in addition to the network server program, the concept of the service server 100 should be understood broadly to include application programs run on the network server, and in some cases, various databases are built in the service server 100. The service server 100 may be implemented as any type of computing device, such as a network server, a web server, a file server, a supercomputer, a desktop computer, or the like, or a combination thereof. To this end, the service server 100 includes at least one processor for processing data, a memory for storing data, and a communication unit for transmitting or receiving data.

Figure 2:
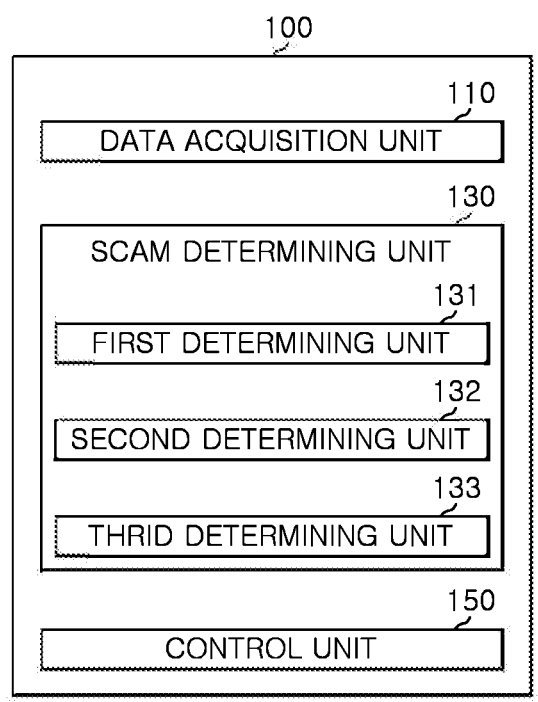
FIG. 2 is a block diagram of a service server according to an embodiment of the present disclosure.

FIG. 2 is a block diagram of a non-limiting embodiment of a service server according to an embodiment of the present disclosure.

Referring to FIG. 2, the service server 100 includes a data acquisition unit 110, a scam determining unit 130, and a control unit 150. The scam determining unit 130 includes a first determining unit 131. In some embodiments, the scam determining unit 130 may include a second determining unit 132 and/or a third determining unit 133.

In various embodiments, the components 110 and 130 may include one or more of at least one processor for processing data, a memory for storing data, and a communication unit for transmitting or receiving data in a wired or wireless manner. For example, the data acquisition unit 110 may include a communication unit. Also, the scam determining unit 130 and the control unit 150 may include at least one processor and a memory for storing data.

The data acquisition unit 110 is configured to acquire data including information on a target coin which will be determined to be a scam coin or not. The data including the information on the target coin may include project data related to the target coin.

The data acquisition unit 110 is configured to access an online space in which project content and development and management details related to the target coin are disclosed and acquire project data from the online space. In some embodiments, the data acquisition unit 110 may access the online space through the World Wide Web (WWW). The data acquisition unit 110 may acquire a judgment item value through a web search.

A first type of project data may include various project-related information which is analyzable in terms of technology, such as utilization of the blockchain technology, and disclosed in the online space.

By way of example, the first type of project data may include judgment items used for determining whether the target coin is a scam coin and values of the judgment items. The judgment items are items related to work details of a coin-related project including coin issuance and management, and may be referred to as a first type of judgment items.

In some embodiments, the first type of project data may include information on one or more judgment items among project storage information, project popularity information, project code change information, project problem information, branch information, tag information, master branch information, and smart contract information. The service server 100 may be preset to perform an operation of determining whether the target coin is a scam coin by pre-using some or all of the plurality of judgment items.

The service server 100 may access the online space through the data acquisition unit 110 to acquire item values of the target coin for preset judgment items directly or indirectly and generate a first type of project data for the target coin including the acquired item values. When the item values are acquired by a user input after the access, this is considered indirect acquisition.

The online space from which the first type of project data is acquired may include, for example, GitHub, other platforms or websites for sharing work details, Twitter, and/or other social media. Each piece of target coin project data may be uploaded to a specific space (e.g., a specific uniform resource locator (URL) address on a sharing platform) in the online space. For example, the service server 100 may access an online space of a specific address, such as GitHub, and search for a first type of project data.

Judgment factors included in a first type of project data will be described in detail below.

The project storage information describes a storage for recording and storing update details of a project which is carried out in relation to the coin. The storage may be a space assigned to each project of the coin in an online space of the sharing platform.

FIG. 3 is an illustrative example of a non-limiting embodiment of a webpage showing coin storage activation states according to an experiment of the present disclosure.

Referring to FIG. 3, the project storage information may include storage activation state information. The storage activation state information may include an activation preparation period of a storage for a corresponding project of a target coin from a project start date to an activation date.

Also, the project storage information may further include update detail information recorded in the storage. The update detail information represents whether an update result is frequently generated at each project storage and stored in a project storage space.

In some embodiments, the update detail information may further include individual update information and the number of project updates. Each piece of the individual update information may include an individual update name, update content, the summary of the update, an updating person (e.g., a project developer or a team member), an update time, and the like.

The service server 100 may acquire values of items of the project storage information by accessing a specific online space (e.g., the webpage of FIG. 3) in which update detail information is disclosed (e.g., by the data acquisition unit 110) and generate project storage information of the target coin.

The project popularity information describes how much people are interested in the corresponding project of the target coin, how much people are watching the project of the target coin (i.e., whether people are fixing information related to the project), or how many times people have forked code of the project in the storage.

In some embodiments, the project popularity information may include pin repository information. The pin repository information is information fixed by a user among project-related information stored in the storage.

Figure 4:
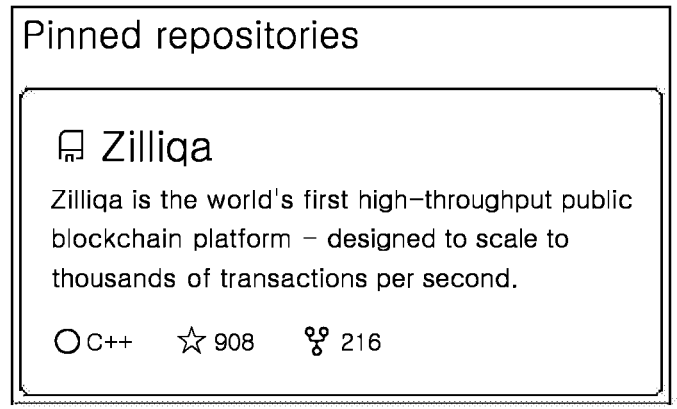
FIG. 4 depicts an illustrative example of a non-limiting embodiment of a webpage showing project popularity information according to an experiment of the present disclosure.

FIG. 4 is an illustrative example of a non-limiting embodiment of a webpage showing project popularity information according to an experiment of the present disclosure.

Referring to FIG. 4, the popularity information may further include fork information and attention information. The popularity information may include an attention number for a corresponding project (e.g., displayed as a star in FIG. 4), a fork number for code of the project in the storage, and/or the like.

The service server 100 may access a specific online space (e.g., the webpage of FIG. 4) in which the project popularity information is disclosed (e.g., by the data acquisition unit 110), acquire values of items of the project popularity information, and generate project popularity information of the target coin. To this end, when there is a main project fixed with a pin, the service server 100 may check information on the main project, and when there is no main project, the service server 100 may acquire pin repository information by checking latest project information.

The project code change information describes details of project code changed by project developers. In some embodiments, the project code change information may include commit information. A commit is a code change operation of storing a part of project code modified or added by developers. The commit information represents whether developers are carrying out a project by developing project code normally.

The commit information includes the number of commits performed for a project of the target coin. The number of commits is the number of times that a commit operation is performed for a project of the target coin.

Figure 5:
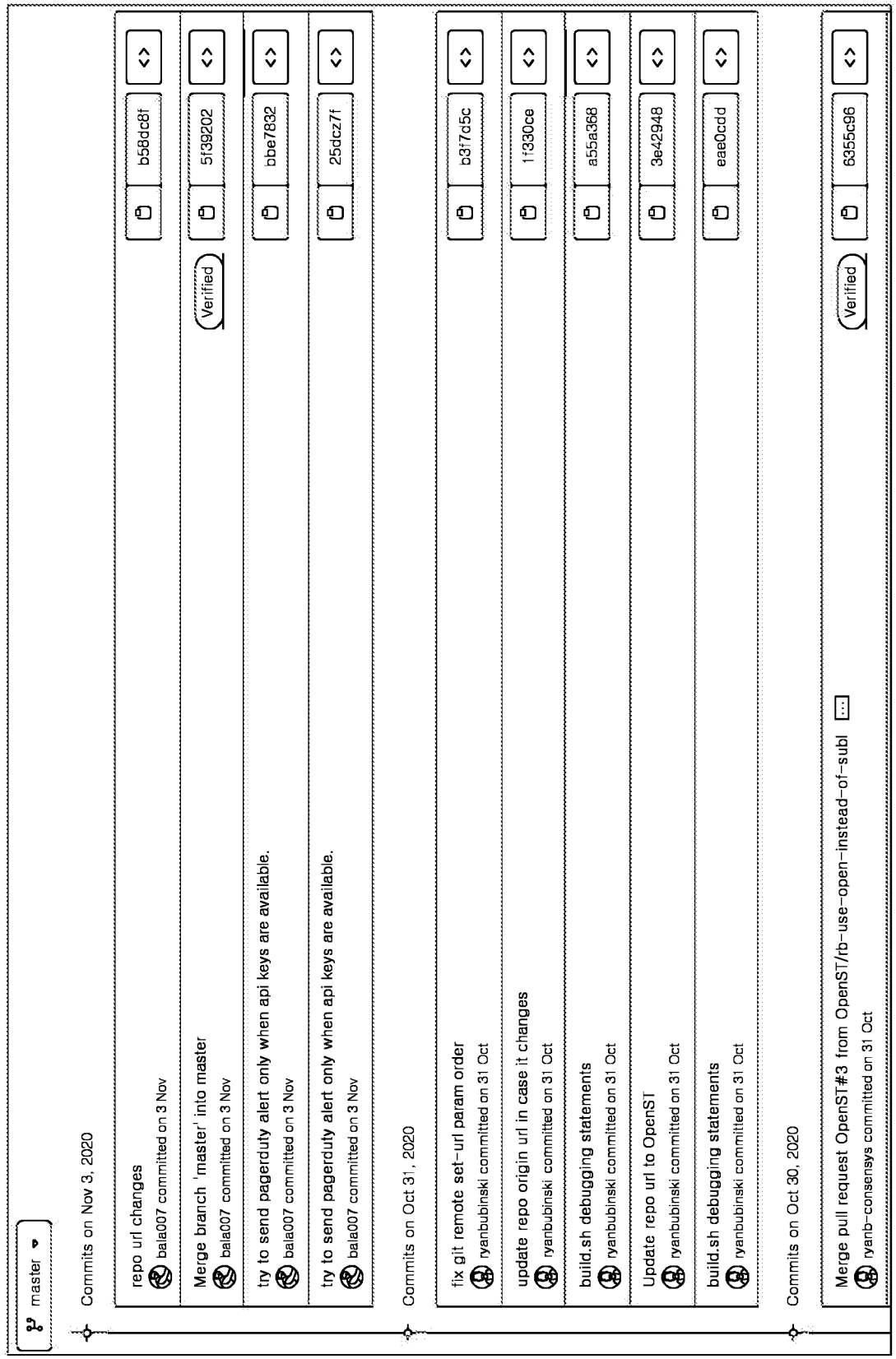
FIG. 5 depicts an illustrative example of a non-limiting embodiment of a webpage showing a commit message according to an experiment of the present disclosure.

FIG. 5 is an illustrative example of a non-limiting embodiment of a webpage showing a commit message according to an experiment of the present disclosure.

Referring to FIG. 5, the project code change information may further include a commit message for each number of commit operations. The commit message describes how developers cooperate with team members, and the culture, atmosphere, or development ability of a development team.

In some embodiments, the commit message may include a work keyword and/or work content. The work keyword may be, for example, "update," "addition," "removal," or "update in progress."

The service server 100 may access a specific online space (e.g., the webpage of FIG. 5) in which the project code change information is disclosed (e.g., by the data acquisition unit 110), acquire values of items of the project code change information, and generate project popularity information of the target coin.

Project issue information describes whether developers carry out a project while performing maintenance management on project code normally.

FIG. 6 is an illustrative example of a non-limiting embodiment of a webpage showing project issue information according to an experiment of the present disclosure.

Referring to FIG. 6, a project issue includes a bug or enhancement. The project issue information includes the number of such project issues which have occurred from a project start date.

A bug is an issue of not being able to implement a predesigned function due to a code error. Enhancement is an issue of having to improve a function due to a present situation or future plan even though the function is implemented as predesigned. During a project, it is necessary to fix a bug or perform enhancement of adding a function that developers have not thought of before. Resolving such an issue represents smooth progress of a project. A developer may resolve an issue by fixing a bug directly. Alternatively, the developer may register an issue to be tackled in the specific online space and share knowledge and solutions with team members to resolve the issue. In the specific online space of FIG. 6 in which issues are registered, work details may be recorded from the registration of the issue to the settlement of the issue.

The project issue information may further include work details for resolving each individual issue. Individual work details include work-related information for resolving each individual issue. For example, work details for resolving each individual issue may include one or more of an issue registration time, an issue type, a name, the number of developers participating in issue resolution, solution content and/or whether each issue has been settled (i.e., closed), and a resolution time regarding each individual issue. The issue type may be a bug or enhancement.

The service server 100 may access a specific online space (e.g., the webpage of FIG. 6) in which the project issue information is disclosed (e.g., by the data acquisition unit 110), acquire values of items of the project issue information, and generate project issue information of the target coin.

The branch information describes branch work details for a project of the target coin. Branching is a development function that is used for developing one project independently in feature units. Developers may implement sub-features of a project using the branch function and then add the sub-features to a master branch, thereby completing a superior project. The branch information describing such branch work represents that several developers simultaneously carry out development in cooperation with each other.

The tag information describes tag work details for a project of the target coin. Tagging is a reference function for a commit having a specific record. Releasing a service involves work of versioning to a specific development completion time point and distributing files. Tag work represents the final end of this work. Tag information describing such tag work also represents that several developers simultaneously carry out development in cooperation with each other.

FIG. 7 depicts an area of a webpage showing branch and tag information according to an experiment of the present disclosure.

Referring to FIG. 7, the branch information may include the number of branches that have been performed for a project related to the target coin since a project start date. Also, the tag information may include the number of tags that have been performed for the project related to the target coin since the project start date.

The service server 100 may access a specific online space (e.g., the webpage of FIG. 7) in which the branch information and the tag information are disclosed (e.g., by the data acquisition unit 110), acquire values of items of the branch information and the tag information, and generate branch information and tag information of the target coin.

The master branch information describes a process or result of work of adding sub-features of a project implemented through the branch function.

FIG. 8 is an illustrative example of a non-limiting embodiment of a webpage showing master branch information according to an experiment of the present disclosure.

Referring to FIG. 8, the master branch information may include detailed information of master branch work recorded in pull requests. When development of sub-features within ranges taken by each project team member are completed and the sub-features are added to a master branch, the adding work is recorded in a pull request. When a plurality of cases of adding work are performed, details of each case are recorded in a pull request.

The detailed information may include a name, a work start date of the master branch, and the like.

Figure 9B:
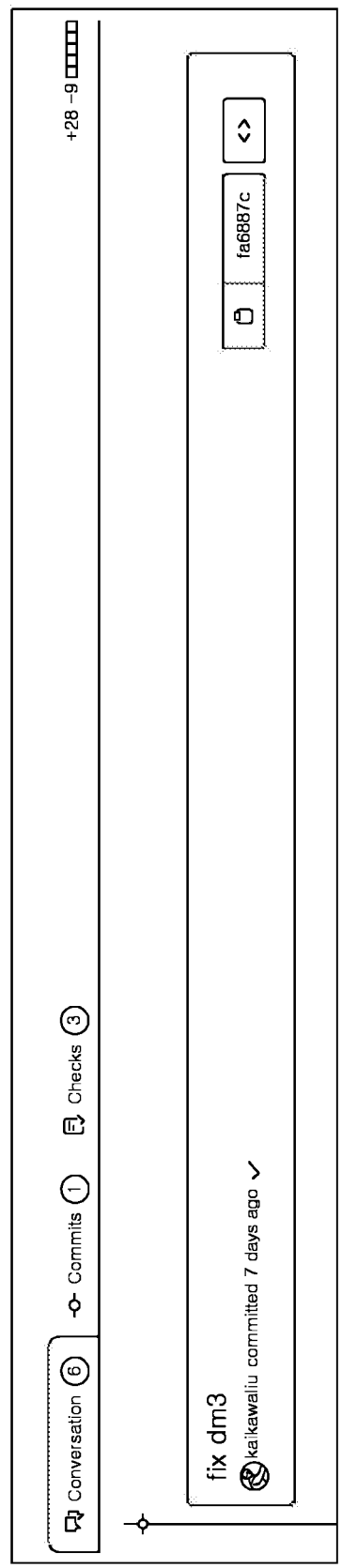

FIGS. 9A to 9C are webpages showing individual work details of a master branch according to an experiment of the present disclosure.

Referring to FIGS. 9A to 9C, individual work details of the master branch may include content of individual work, a code change, and a file modification. As shown in FIG. 9A, the content of work may include conversation information. As shown in FIG. 9B, a code change may include commit information recorded in a pull request due to master branch work. As shown in FIG. 9C, the file modification may include files changed information recorded in the pull request due to master branch work.

The service server 100 may access a specific online space (e.g., the webpage of FIG. 8 or FIGS. 9A through 9C) in which the master branch information is disclosed (e.g., by the data acquisition unit 110), acquire values of items of the master branch information, and generate master branch information of the target coin.

The smart contract information describes a smart contract applied to the corresponding coin. Since every coin has a smart contract regardless of blockchain series such as Bitcoin (BTC), Ethereum (ETH), and the like, a smart contract may be meaningfully used for determining whether a coin is a scam coin.

In some embodiments, the smart contract information may include the amount of issuance, the amount of transmission, and other white paper information in a white paper.

The service server 100 may access a specific online space in which the white paper information of the target coin is disclosed (e.g., by the data acquisition unit 110), acquire values of items of the white paper information, and generate smart contract information of the target coin.

In some embodiments, the project data may further include project management information and/or project overview information.

The project management information describes whether a project is managed well.

Figure 10A:
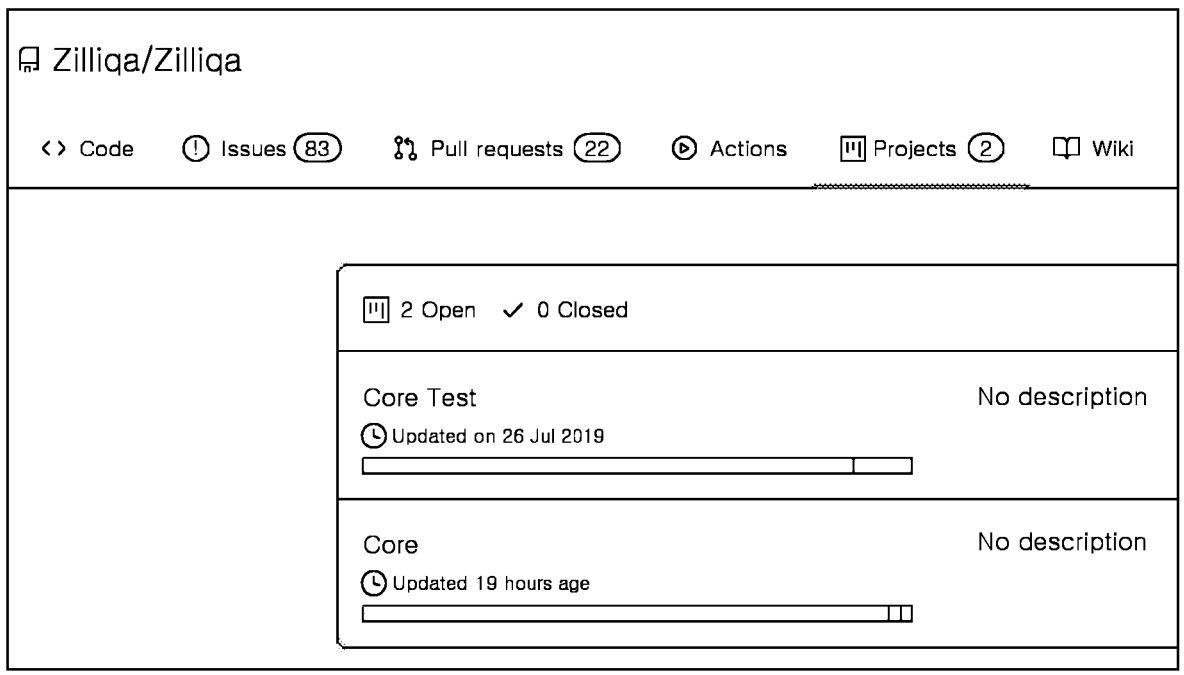
FIGS. 10A and 10B are webpages showing project management information according to an experiment of the present disclosure, where.
Figure 10B:
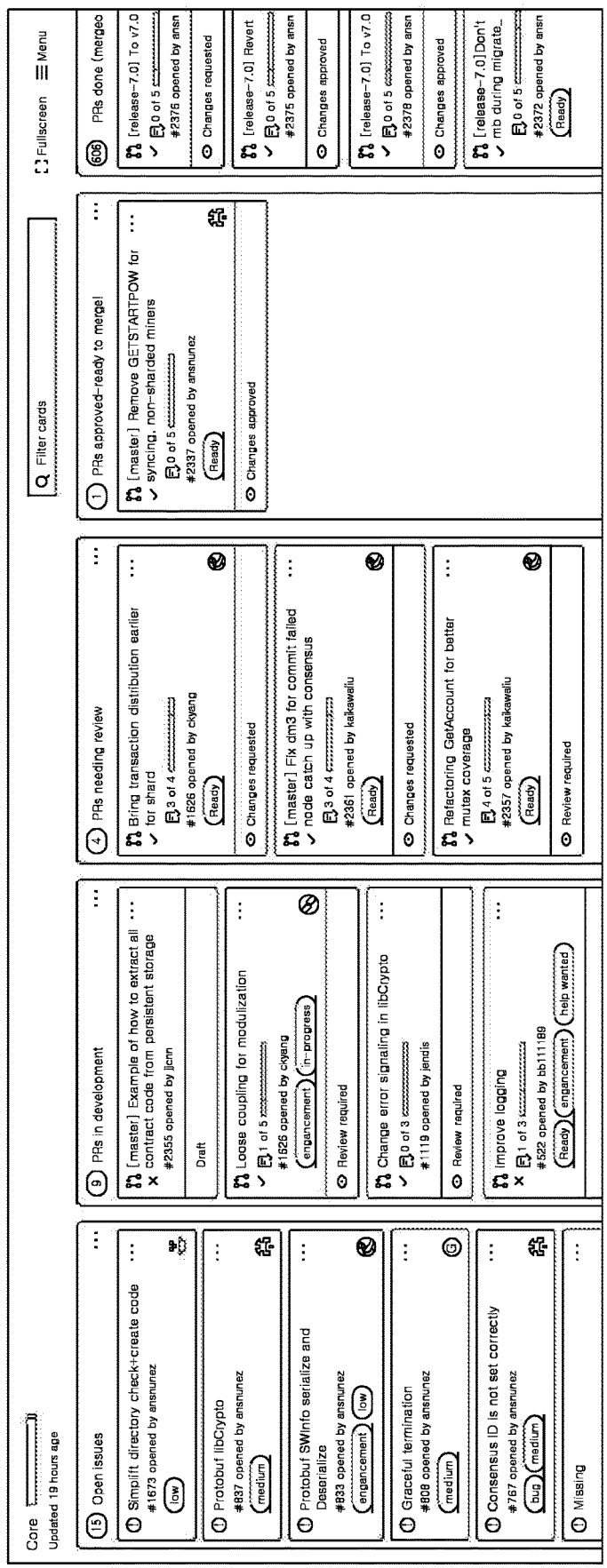

FIGS. 10A and 10B are illustrative examples of non-limiting embodiments of webpages showing project management information according to an experiment of the present disclosure. FIGS. 10A and 10B show project panels for two different projects.

Referring to FIGS. 10A and 10B, the project management information may include project panel information. The project panel information may include a core test, a core progress rate, and core content.

When a specific online space (e.g., the webpage of FIG. 10) in which a project is managed on a kanban board is in a project panel, the service server 100 may acquire project panel information from the specific online space.

The project overview information briefly describes the overall progress of a project for each of certain time periods.

FIGS. 11A to 11D are illustrative examples of non-limiting embodiments of webpages showing project management information according to an experiment of the present disclosure.

Figure 11A:
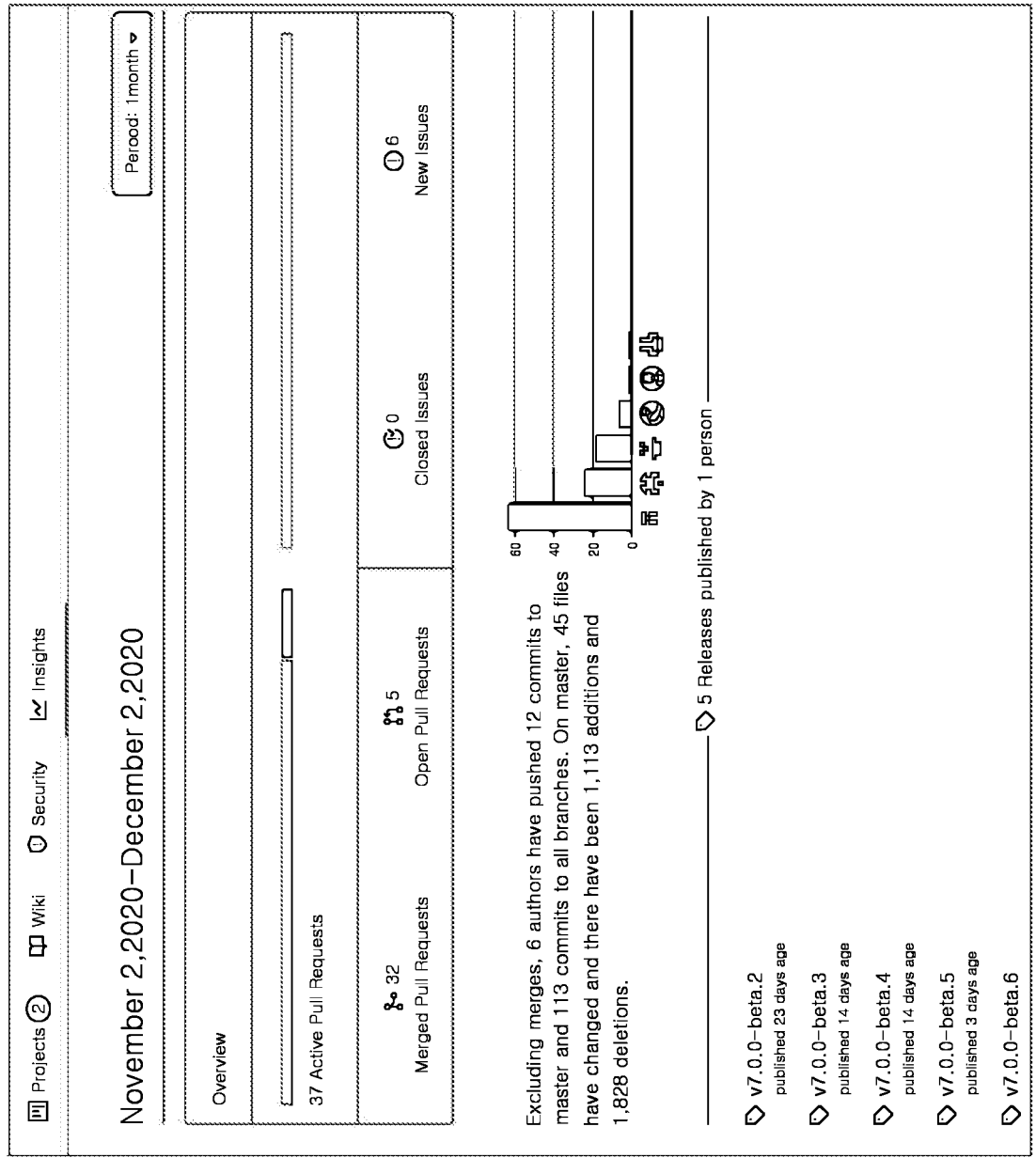
FIGS. 11A to 11D depict illustrative examples of non-limiting embodiments of webpages showing project management information according to an experiment of the present disclosure, where.
Figure 11B:
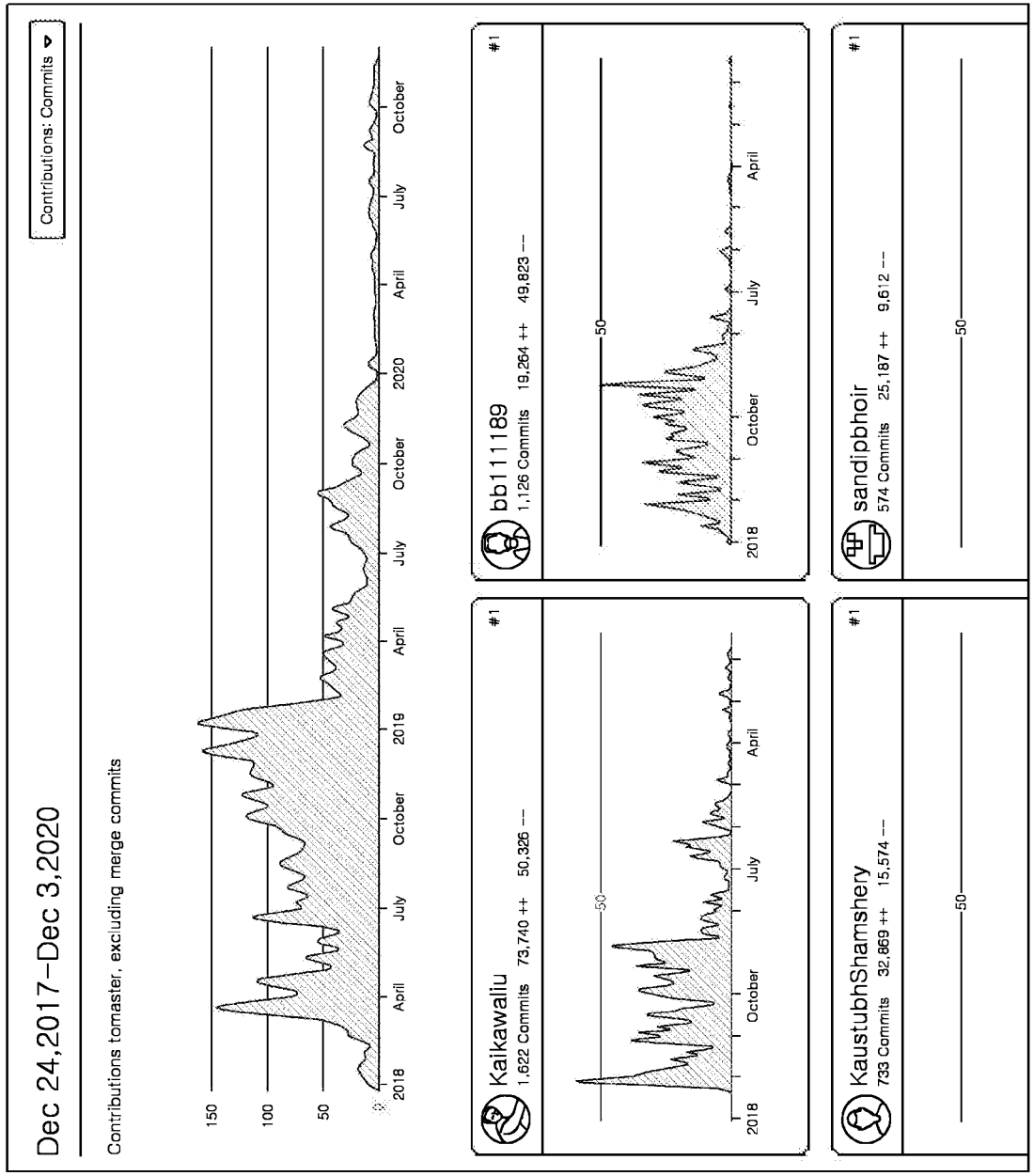
Figure 11C:
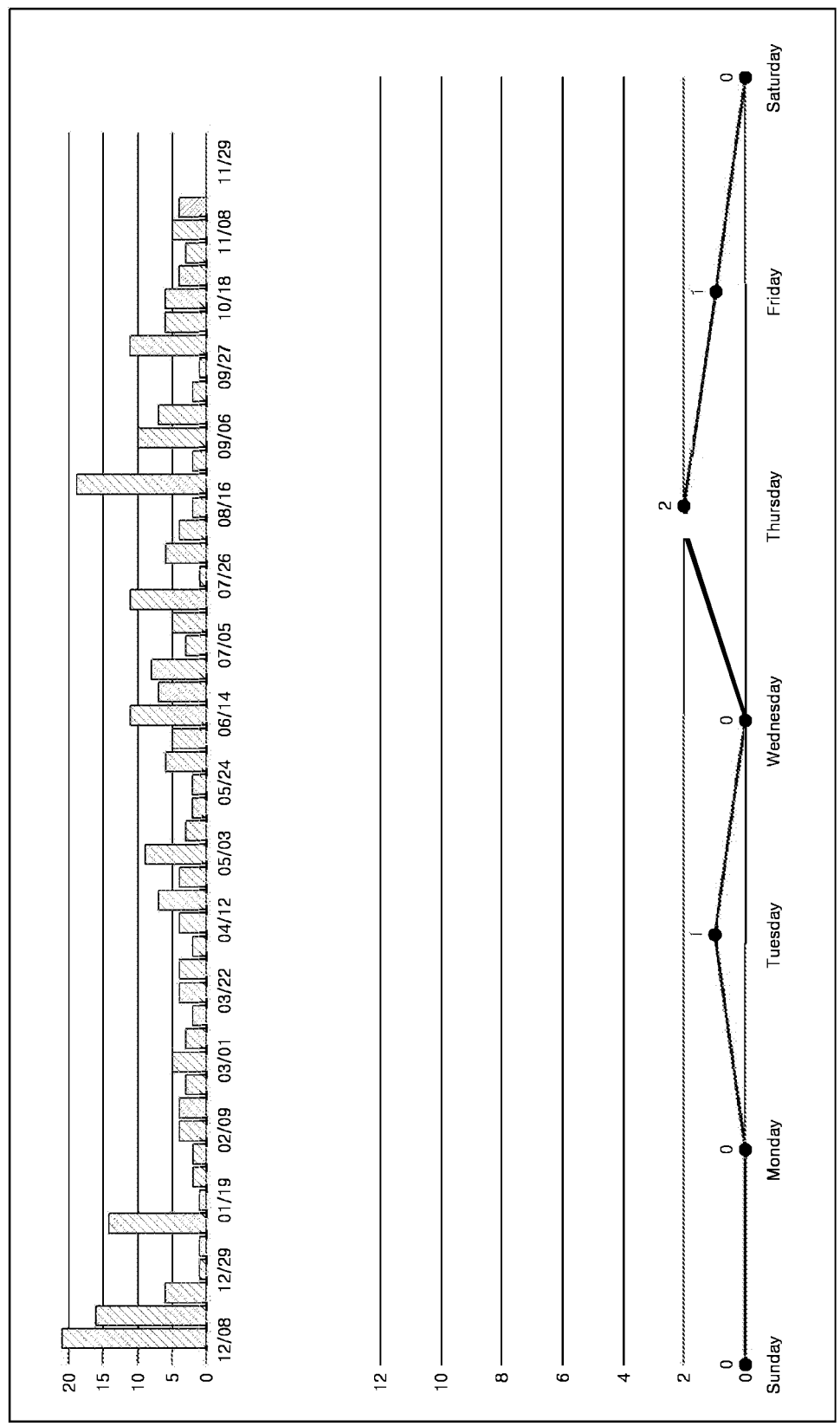
Figure 11D:
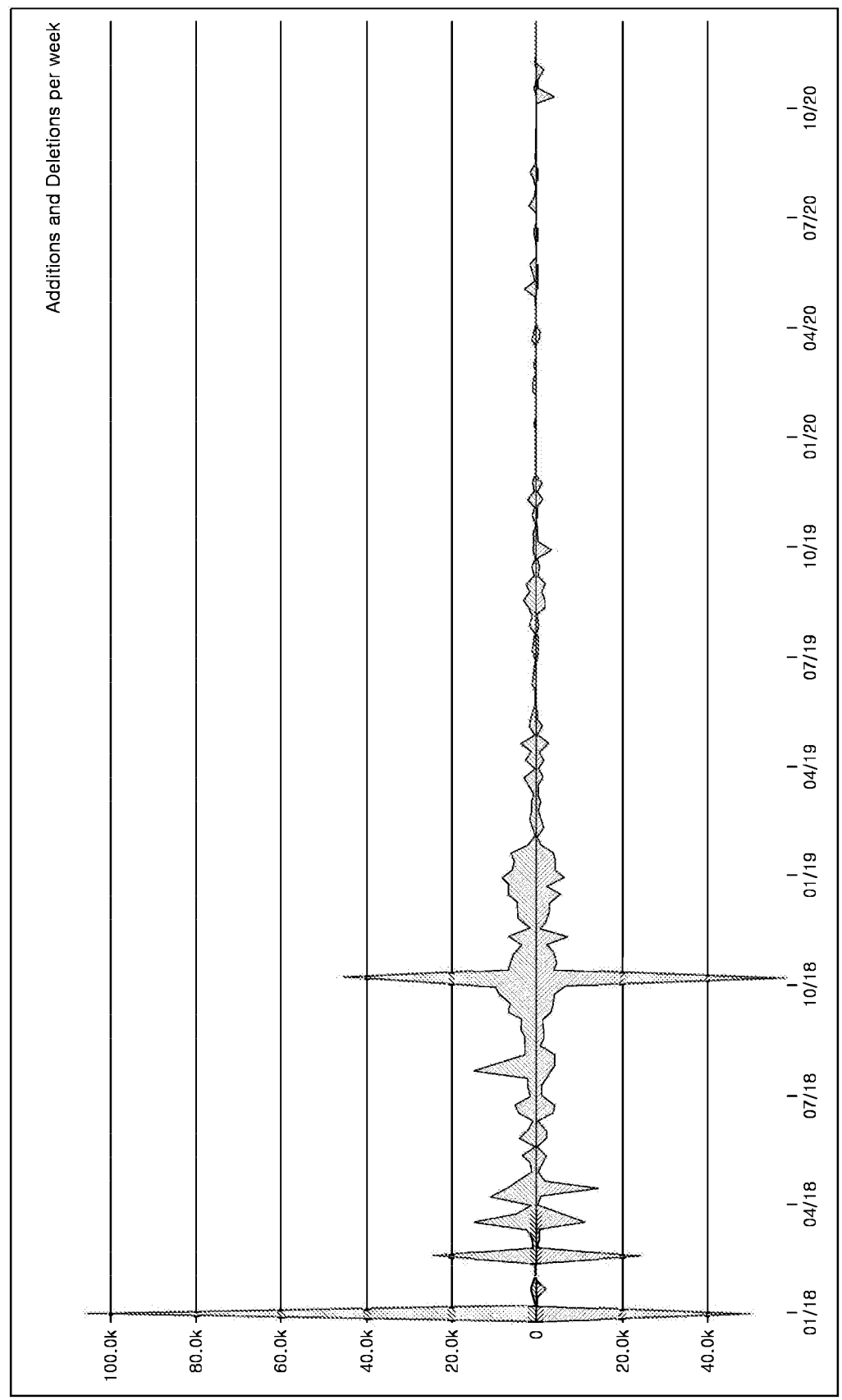

Referring to FIGS. 11A to 11D, the project management information may include an update overview which is obtained by partially summarizing update details of a project. The update overview may be compressed into a certain time period. FIG. 11B shows contribution representing who is contributing to a project and their contributions relative to other contributors. FIG. 11C shows commit activity during certain period. FIG. 11D shows code frequency representing additions and deletions over the lifetime of a project. Upper graph drawn in the positive area of the vertical axis represents additions, and lower graph drawn in the negative area of the vertical axis represents deletions.

The service server 100 may search a specific online space (e.g., the Insights tab of GitHub shown in FIGS. 11A through 11D) for project-specific overviews and acquire project overview information.

Also, the data acquisition unit 110 may be configured to further acquire a second type of project data and/or a third type of project data.

The second type of project data may include judgment items representing progress and management information of a target coin project that is analyzable or checkable in aspects of the real world. Such judgment items may be referred to as a second type of judgment items.

In some embodiments, the second type of project data may include information on one or more judgment items among a foundation office item, a foundation employee item, a relationship item between a foundation headquarters and a domestic organization, a representative foundation number item, a representative homepage item, a white paper of the target coin, and an official foundation account number item. The second type of project data may also be represented as whether each judgment item has an item value.

The foundation office information includes a geographical address of a foundation office. In some embodiments, the foundation office information may further include a type of building in which the office is present, a type of office lease, and a running period of the office. The type of building may include a shared office. The type of office lease may be a purchase, a long-term lease (e.g., a lease on a deposit basis or a long-term monthly lease), or a short-term lease.

The foundation employee information includes the total number of foundation employees. In some embodiments, the foundation employee information may further include the number of each type of employees. The types of employees may include development staff.

When a foundation is established overseas due to business regulations or tax law issues, the relationship between a foundation headquarters and a domestic organization describes the affiliation between the overseas foundation and the domestic organization.

The white paper is the most important document to inform the public about a foundation or project. The white paper includes the foundation's basic target coin development direction, technical resources, a financial resource utilization plan, a roadmap, coin economics, and other information necessary for running the foundation.

The third type of project data may include judgment items representing information that is analyzable in social aspects and submitted by a foundation of the target coin to satisfy the legal and institutional conditions required for coins. Such judgment items may be referred to as a third type of judgment items.

In some embodiments, the third type of project data may include information on one or more judgment items among a registered foundation type, a prespecified authentication policy introduction item, a personal information protection item, and a money tracking solution development item.

Information on the registered foundation type describes as which one of a plurality of prespecified foundation types the foundation has been registered. When the foundation is registered, the foundation is classified as a business type. Things to be checked vary depending on whether the foundation provides a technical service or a business-to-customer (B2C) service.

The authentication policy may be a policy for a national institution or a market institution to manage and supervise a coin system in order to protect coin customers. When the foundation provides a B2C service and is a virtual asset operator, it is necessary to build a system satisfying a know your customer (KYC) authentication policy. Whether the target coin satisfies the KYC authentication policy represents whether the target coin is managed by the Financial Action Task Force on money laundering (FATF) and managed and supervised by an administrative organ.

Whether personal information is protected may include whether there is a person in charge of personal information protection. In the case of providing a coin service, whether there is a person in charge of protecting customers' personal information is an important factor for determining reliability of a foundation. Domestically, all institutions that handle personal information are obliged to appoint and notify of a person in charge of personal information protection.

Whether the target coin satisfies the obligation may be determined using whether personal information is protected.

The money tracking solution is a solution for tracking the flow of a coin. The money tracking solution may be, for example, an anti-money laundering (AML) solution but is not limited thereto.

The service server 100 may acquire item values of the second type of judgment items or the third type of judgment items for the target coin through a web search or the like in the communication network 10.

Referring back to FIG. 2, the scam determining unit 130 determines whether the target coin is a scam coin by analyzing the acquired data.

The first determining unit 131 may determine whether the target coin is a scam coin on the basis of the first type of project data.

Most coin projects disclose work details for corresponding coins in online spaces that are accessible through the communication network 10 such as GitHub. The online space may include, for example, GitHub, other platforms or websites for sharing work details, Twitter, and/or other social media.

Scam coins tend to prefer a space that may not be easily retrieved rather than a public online space such as a website. However, scam coins which cause huge economic losses for a large number of investors can pretend to be non-scam coins by disclosing work details in public online spaces.

The first determining unit 131 analyzes the first type of project data acquired from such a public online space.

The first determining unit 131 may determine that the target coin has a relatively low probability of being a scam coin when updates of a project related to the target coin are more frequent, an attention or fork number for a project related to the target coin is relatively large, the number of commits for a project related to the target coin is relatively large, the number of issues for a project related to the target coin is relatively large, the number of branches is relatively large, and/or the number of tags is relatively large. For example, when the number of tags is relatively large, the target coin has a relatively low probability of being a scam coin. This is because frequent tags represent that cooperation proceeds well in versioning and distribution work units. Also, when the number of branches is relatively large, the target coin has a relatively low probability of being a scam coin. This is because frequent branches represent that cooperation proceeds well in feature units.

In specific embodiments, the first determining unit 131 may calculate verification grades for a first type of judgment items by applying the first type of project data for the target coin to a preset verification guide and determine whether the target coin is a scam coin on the basis of the calculated verification grades for the first type of judgment items.

FIG. 12 shows a verification guide according to an embodiment of the present disclosure.

Referring to FIG. 12, the verification guide includes a plurality of verification grades for classifying a first type of judgment items that may be included in a first type of project data by corresponding item values and may be formed in a table structure. When a coin corresponds to an upper one of the plurality of verification grades, the coin has a lower probability of being a scam coin, and when a coin corresponds to a lower one of the plurality of verification grades, the coin has a higher probability of being a scam coin. The verification grade to which scam coins belong is a lower level than the verification grade to which other non-scam coins belong. For example, when the verification guide consists of grade A to grade E as shown in FIG. 12, grade A represents the highest probability of being a scam coin, and grade E represents the lowest probability of being a scam coin.

Each verification grade may be defined as a range value according to a first type of judgment item. Even identical verification grades may be defined with different range values according to a first type of judgment items. A verification grade of a project storage item is defined according to a storage activation time. The verification grade for a project storage item may be defined as a lower level when a storage activation time is relatively longer. The verification grade to which the target coin with a relatively long storage activation time belongs is a lower grade than the verification grade to which another coin with relatively short storage activation times belongs. This is because scam coins have a relatively long storage activation time such as a minimum of a quarter or year.

For example, a plurality of verification grades for a storage item may be defined with a range from a preparation period of 0 hours to 1 hour until an active state, a range from 1 hour to 24 hours, a range from 1 day to 30 days, a range from 1 month to 12 months, and a range of 1 year or more. Here, 1 month indicates more than 30 days. Also, a plurality of verification grades for a pin repository item in project popularity information may be defined with a range of more than 300 times, a range of less than 300 times, a range of less than 100 times, and a range of less than 10 times. A plurality of verification grades for a fork item in project popularity information may be defined with a range of more than 10,001 times, a range of less than 10,000 times, a range of less than 5,000 times, a range of less than 1,000 times, and a range of less than 100 times. A plurality of verification grades for a code change item or a project issue item may be defined with a range of more than 10,001 times, a range of less than 10,000 times, a range of less than 5,000 times, a range of less than 1,000 times, and a range of less than 100 times. A plurality of verification grades for branch and tag items may be defined with a range of more than 300 times, a range of less than 100 times, a range of less than 50 times, and a range of less than 10 times.

Referring back to FIG. 2, the first determining unit 131 may select first type judgment items having low grades which are a threshold grade or lower among a plurality of verification grades calculated for the first type of judgment items and determine whether the target coin corresponds to a scam coin using the selected first type of judgment items.

In some embodiments, the threshold grade may be under an intermediate grade among the plurality of grades in the verification guide. For example, in FIG. 12, the threshold grade may be set to grade D or grade E.

In some embodiments, the first determining unit 131 may determine whether the target coin corresponds to a scam coin on the basis of the number of selected first type judgment items. When a larger number of judgment items correspond to grade E, the first determining unit 131 may determine the target coin as a scam coin.

In some other embodiments, the first determining unit 131 may calculate a representative verification grade of the target coin on the basis of the verification grades for the judgment items and determine the target coin as a scam coin when the representative verification grade is the threshold grade or lower.

The representative verification grade may be calculated on the basis of an average or a weighted average.

In some embodiments, the first determining unit 131 may calculate the representative verification grade of the target coin by calculating a weighted average of the verification grades for the judgment items through the following equation.

$$\text{Representative verification grade} = Wa*Ra + Wb*Rb + \ldots + Wn*Rn \quad \text{[Equation 1]}$$

Here, n is the number of judgment items. W is a weight for a judgment item (e.g., a) and has a value of 0 to 1. R is a verification grade for a judgment item (e.g., a).

At least one of a first weight for a project popularity item and a second weight for a code change item among weights for the judgment items may be set to a higher weight value than the other weights. This is because scam coins have a notably low fork frequency and commit frequency.

When the representative verification grade value is higher than the preset threshold grade, the first determining unit 131 determines that the coin is not a scam coin. When the representative verification grade value is the preset threshold grade or lower, the first determining unit 131 determines that the coin is a scam coin.

Also, the first determining unit 131 may be further configured to determine that the target coin has a relatively high probability of being a scam coin when a commit message only includes a keyword of code change work, such as "update," "add," or "remove," without content of the work. This is because, when the quality of content is higher, the reliability of a project is higher. In this case, the first determining unit 131 may calculate a verification grade for a project code change item using the verification guide, and the calculated verification grade for the code change item may be modified according to whether the commit message includes content of the commit operation. In some embodiments, an already calculated verification grade for the code change item may be modified one grade down (e.g., from grade A to grade B).

Also, the first determining unit 131 may be further configured to determine the probability of the target coin being a scam coin on the basis of individual issue information in the project issue information more accurately than in a case in which only the number of issues is taken into consideration.

In this way, the first determining unit 131 determines whether the target coin is a scam coin by analyzing a project of the target coin in terms of data technology.

In addition, the scam determining unit 130 may correct the judgment result of the first determining unit 131 on the basis of a judgment result of the second determining unit 132 and/or a judgment result of the third determining unit 133. The judgment result used for the correction is a qualitative scan judgment result for compensating for the judgment result of the first determining unit 131, which is a quantitative scam judgment result.

Referring back to FIG. 2, the second determining unit 132 is configured to additionally determine whether the target coin is a scam coin on the basis of a second type of project data. A judgment result of the second determining unit 132 may correspond to a viewpoint of a person who generally looks at a business as a fraudulent company in the real world.

The second determining unit 132 may determine whether each of the second type judgment items has an item value and determine whether the target coin corresponds to a scam coin using second type judgment items having an item value.

In some embodiments, the second determining unit 132 may calculate a first judgment score on the basis of the second type judgment items having an item value and determine the target coin as a scam coin when the calculated first judgment score is a threshold score or less.

The first judgment score may represent the number of second type judgment items having an item value or may be calculated through another calculation process. For example, when there are a larger number of second type judgment items having an item value, a higher first judgment score may be calculated, and thus the target coin may not be determined to be a scam coin.

Also, to calculate the first judgment score, the second determining unit 132 may be further configured to calculate a weighted average of the second type of project data for the target coin.

In this case, a weight for a foundation office item may be set on the basis of a type of building in which the office is present, a type of office lease, and a lease period of the office. When the office is a shared office, corresponds to a short-term lease, or has a shorter running period, the weight may be set to a relatively low value.

Also, a weight for a foundation employee item may be set on the basis of the number of employees. When the number of employees increases, the weight may be set to a higher value. In some embodiments, the weight for the foundation employee item may be set on the additional basis of types of employees. When different target coins have the same number of employees, a higher weight value may be set for the foundation employee item of a target coin having a larger number of employees in the development field.

The third determining unit 133 is configured to additionally determine whether the target coin is a scam coin on the basis of a third type of project data. A judgment result of the third determining unit 133 may correspond to a viewpoint of a person who looks at a business as a reliable business from legal and institutional points of view in the real world.

The third determining unit 133 may determine whether each of the third type judgment items has an item value and determine whether the target coin corresponds to a scam coin using the third type judgment items having an item value.

In some embodiments, the third determining unit 133 may calculate a second judgment score on the basis of the third type judgment items having an item value and determine the target coin as a scam coin when the calculated second judgment score is a threshold score or less. The second judgment score may represent the number of third type judgment items having an item value or may be calculated through another calculation process. For example, when there are a larger number of third type judgment items having an item value, a higher second judgment score may be calculated, and thus the target coin may not be determined to be a scam coin.

Also, to calculate the second judgment score, the third determining unit 133 may be further configured to calculate a weighted average of the third type of project data for the target coin. Here, a weight for an authentication policy item, a weight for a personal information protection item, and a weight for a money tracking solution development item may be set to a higher value than other weights.

In some embodiments, weights for the second type judgment items and weights for the third type judgment items may be set on the basis of a frequency at which each type of judgment item has a value among a plurality of target coins. A relatively high weight may be given to a judgment item having an item value at a low frequency.

For example, when there are very few target coins having a money tracking solution, a target coin having a money tracking solution has a high probability of not being a scam coin, and it is necessary to recognize time and economic resources spent building and applying the money tracking solution. Then, a weight for the money tracking solution item may be set to a relatively high value so that target coins having a money tracking solution may be favorably judged.

In some embodiments, the data acquisition unit 110 may be configured to acquire a second type of project data and/or a third type of project data regarding a target coin that is not determined to be a scam coin by the first determining unit 131. Also, the second determining unit 132 and the third determining unit 133 may additionally determine whether a target coin which is not determined to be a scam coin by the first determining unit 131 is a scam coin. Then, the scam determining unit 130 analyzes the second type of project data or the third type of project data regarding the target coin which is not determined to be a scam coin by the first determining unit 131. When the target coin is determined to be a scam coin by analyzing the second type of project data or the third type of project data, the scam determining unit 130 performs an operation of redetermining the target coin as a scam coin, that is, correcting the existing judgment result.

The control unit 150 controls overall operations, which are performed by the service server 100, of acquiring data and determining whether the target coin is a scam coin by analyzing the data. The control unit 150 may pre-store a program including commands for performing operations of a system or method for determining a blockchain-based cryptocurrency corresponding to a scam coin and control operations of the components 110 and 130 by executing the program.

It is obvious to those of ordinary skill in the art that the system 1 may include other components which have not been described in this specification. For example, the system 1 may further include an output device, such as a data input device, a display, and/or a printer, a network, a network interface, a protocol, and the like.

Figure 13:
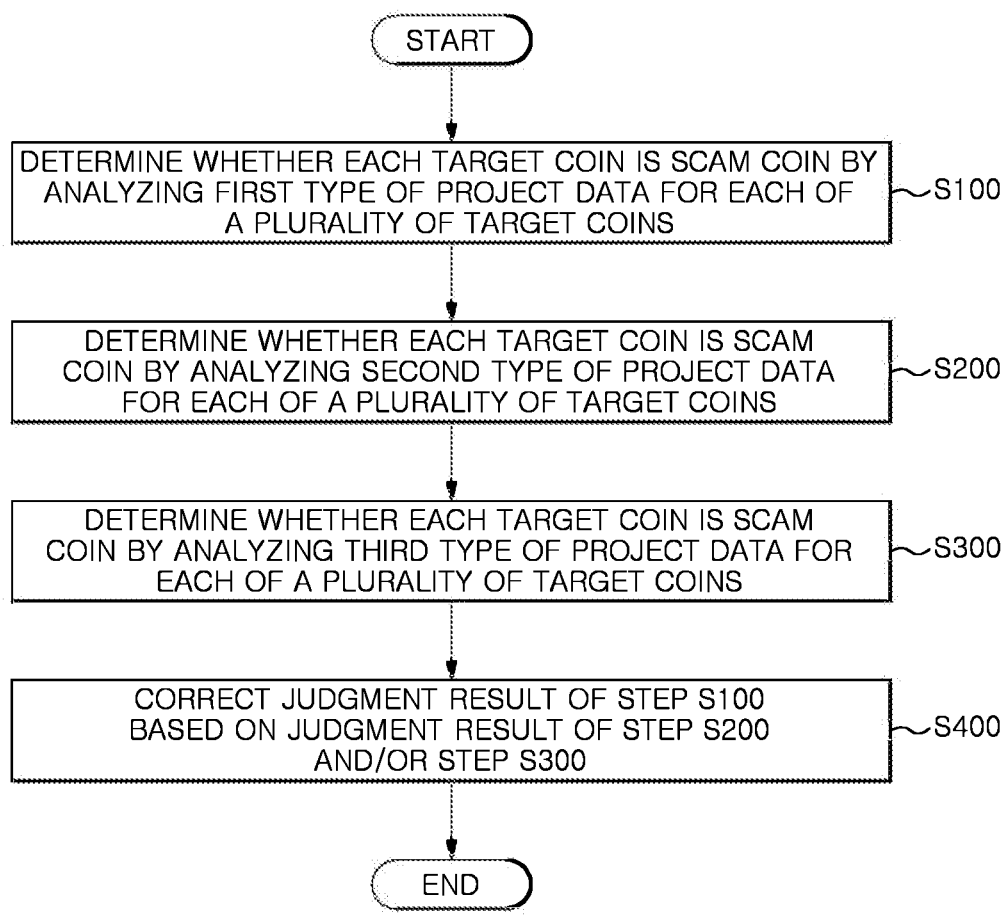
FIG. 13 depicts a flowchart of a method of determining a blockchain-based cryptocurrency corresponding to a scam coin according to another aspect of the present disclosure.

FIG. 13 is a flowchart of a method of determining a blockchain-based cryptocurrency corresponding to a scam coin according to another aspect of the present disclosure.

The scam coin determining method FIG. 13 may be performed by one or more computing devices such as the scam coin determining system 1 of FIG. 1.

Referring to FIG. 13, the scam coin determining method includes a step S100 of analyzing a first type of project data for each of a plurality of target coins to determine whether each target coin is a scam coin.

The first type of project data for each target coin may include item values of the target coin regarding one or more judgment items among project storage information, project popularity information, project code change information, project problem information, branch information, tag information, master branch information, and smart contract information.

Figure 14:
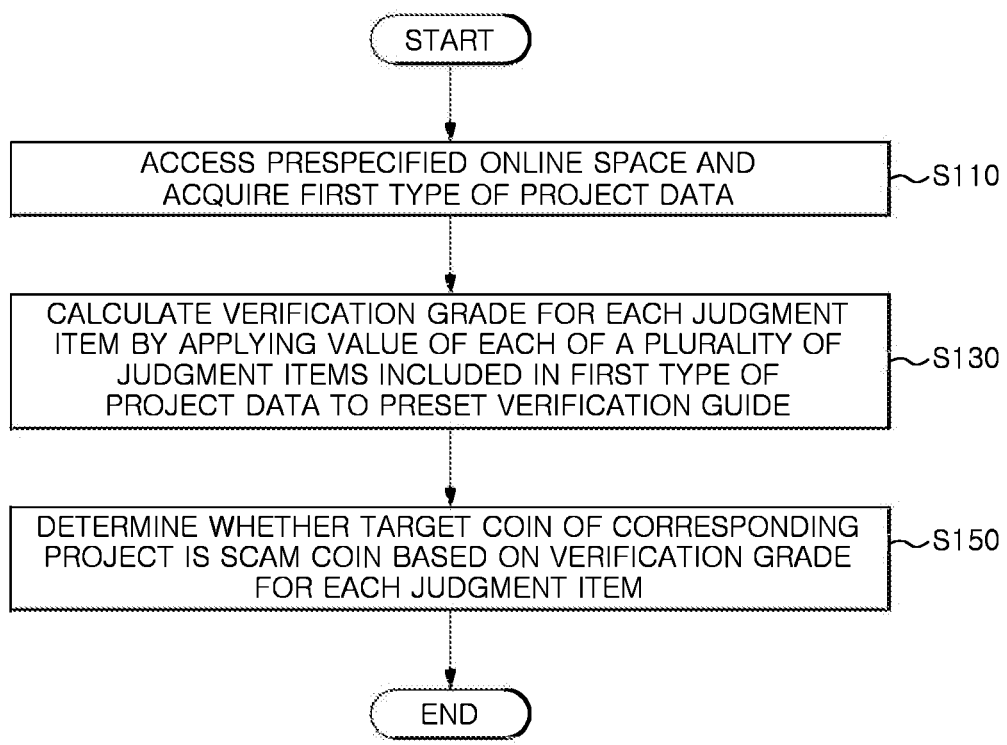
FIG. 14 depicts a detailed flowchart of a step (S100) of analyzing a first type of project data for each of a plurality of target coins to determine whether each target coin is a scam coin according to an embodiment of the present disclosure.

FIG. 14 is a detailed flowchart of the step S100 of analyzing a first type of project data for each of a plurality of target coins to determine whether each target coin is a scam coin according to an embodiment of the present disclosure.

Referring to FIG. 14, the step S100 includes a step of accessing a prespecified online space to acquire the first type of project data. In some embodiments, the first type of project data for a target coin may be generated by accessing a space prespecified for each judgment item and acquiring a corresponding item value (S110).

Since such a first type of project data and an operation of acquiring the first type of project data have been described above with reference to FIGS. 3 to 11, the detailed description thereof will be omitted.

The step S100 may include a step S130 of applying values of a plurality of judgment items included in the first type of project data to a preset verification guide regarding each target coin to calculate a verification grade for each judgment item and a step S150 of determining whether a target coin of a corresponding project is a scam coin on the basis of a verification grade for each judgment item.

In some embodiments, the step S130 may include a step of calculating a verification grade for a project code change item on the basis of the verification guide and modifying the calculated verification grade for the code change item according to whether a commit message includes content of a commit operation.

Since the operation of calculating a verification grade on the basis of the preset verification guide in the step S130 has been described above with reference to FIG. 12, the detailed description thereof will be omitted.

In some embodiments, the step S150 may include a step of selecting first type judgment items having low grades which are a threshold grade or lower among a plurality of verification grades calculated for the first type of judgment items and a step of determining whether the target coin corresponds to a scam coin using the selected first type judgment items.

In some embodiments, the step of determining whether the target coin corresponds to a scam coin using the selected first type judgment items may be a step of determining whether the target coin corresponds to a scam coin on the basis of the number of selected first type judgment items.

In some other embodiments, the step of determining whether the target coin corresponds to a scam coin using the selected first type judgment items may include a step of calculating a representative verification grade of the target coin on the basis of the verification grades for the judgment items and a step of determining the target coin as a scam coin when the representative verification grade is the threshold grade or lower. The representative verification grade may be calculated on the basis of an average or a weighted average.

When the representative verification grade is a weighted average, at least one of a first weight for a project popularity item and a first weight for a code change item among weights for the judgment items may be set to a higher weight value than the other weights.

Since the operation of determining whether the target coin corresponds to a scam coin in the step S150 has been described above with reference to the first determining unit 131, the detailed description thereof will be omitted.

Referring back to FIG. 13, the scam coin determining method may further include a step S200 of determining whether each target coin is a scam coin by analyzing a second type of project data for each of the plurality of target coins and/or a step S300 of determining whether each target coin is a scam coin by analyzing a third type of project data for each of the plurality of target coins.

The step S200 includes a step of acquiring a second type of project data by accessing a prespecified online space and a step of determining whether each of second type judgment items has an item value and determining whether the target coin corresponds to a scam coin using second type judgment items having an item value.

The second type of project data for each target coin acquired in the step S200 may include item values of the target coin regarding one or more judgment items among foundation office information, foundation employee information, a relationship item between a foundation headquarters and a domestic organization, whether there is a representative foundation number, whether there is a representative homepage, a white paper of the target coin, and whether there is an official foundation account number.

In some embodiments, the step of determining whether each of second type judgment items has an item value and determining whether the target coin corresponds to a scam coin using second type judgment items having an item value may include a step of calculating a first judgment score on the basis of the second type judgment items having an item value and a step of determining the target coin as a scam coin when the calculated first judgment score is a threshold score or less.

In the step of calculating the first judgment score, a weighted average of a second type of product data for the target coin may be calculated as the first judgment score.

Since operations of the step S200 have been described above with reference to the second determining unit 132, the detailed description thereof will be omitted.

The step S300 includes a step of acquiring a third type of project data by accessing a prespecified online space and a step of determining whether each of third type judgment items has an item value and determining whether the target coin corresponds to a scam coin using third type judgment items having an item value.

The third type of project data for each target coin acquired in the step S300 may include item values of the target coin regarding one or more judgment items among a registered foundation type, a prespecified authentication policy introduction item, a personal information protection item, and a money tracking solution development item.

In some embodiments, the step of determining whether each of third type judgment items has an item value and determining whether the target coin corresponds to a scam coin using third type judgment items having an item value may include a step of calculating a second judgment score on the basis of the third type judgment items having an item value and a step of determining the target coin as a scam coin when the calculated second judgment score is a threshold score or less.

Also, in the step of calculating the second judgment score, a weighted average of a third type of product data for the target coin may be calculated as the second judgment score.

Since operations of the step S300 have been described above with reference to the third determining unit 133, the detailed description thereof will be omitted.

In specific embodiments, the step S200 and the step S300 may be performed for a target coin which is not determined to be a scam coin among the plurality of target coins. Then, the scam coin determining method may include a step S400 of correcting the judgment result of the step S100 on the basis of the judgment result of the step S200 and/or the step S300.

The step S400 may include a step of redetermining the target coin as a scam coin when the target coin is determined to be a scam coin by analyzing the second type of project data or the third type of project data regarding the target coin which is not determined to be a scam coin in the step S100. In the step S400, for the target coin not determined as a scam coin in step (S100), analyzing the project data of the second type or the third type to further determine whether the target coin corresponds to the scam coin; and finally determining the target coin as a scam coin when the target coin is determined to be a scam coin as a result of analyzing projector data of the second type or the third type of the target coin.

When embodiments of the present disclosure are implemented using hardware, application-specific integrated circuits (ASICs), digital signal processors (DSPs), digital signal processing devices (DSPDs), programmable logic devices (PLDs), field programmable gate arrays (FPGAs), or the like configured to perform the embodiments of the present disclosure may be provided among components of the present disclosure.

Operations of the system or method for determining a blockchain-based cryptocurrency corresponding to a scam coin according to the embodiments of the present disclosure described above may be at least partially implemented as a computer program and recorded on a computer-readable recording medium. For example, the operations may be implemented with a program product configured as a computer-readable medium including program code, and executed by a processor for any or all of the described steps, operations, or processes.

The computer-readable recording medium includes any type of recording device in which computer-readable data is stored. Examples of the computer-readable recording medium include a read-only memory (ROM), a random-access memory (RAM), a compact disc (CD)-ROM, magnetic tape, a floppy disk, an optical data storage device, and the like. Also, the computer-readable recording medium may be distributed to computer systems that are connected through a network so that computer-readable code may be stored and executed in a distributed manner. Also, functional programs, code, code segments for implementing the embodiments can be easily understood by those of ordinary skill in the art to which the embodiments pertain.

Although the present disclosure has been described with reference to the embodiments shown in the accompanying drawings, these are merely exemplary, and those of ordinary skill in the art should understand that various modifications can be made from the embodiments. However, these modifications should be construed as falling within the scope of the present disclosure. Therefore, the scope of the present disclosure is to be determined from the technical spirit of the following claims.

What is claimed is:

1. A system comprising a service server connected to a communication network,
wherein the service server comprises:
a data acquisition unit configured to access a prespecified online space through the communication network and acquire project data representing blockchain based cryptocurrency development attributes, wherein the project data comprises a first type of project data comprising a first type of judgment items including:
project storage information including storage information relating to a project of a target coin implemented as a blockchain based cryptocurrency,
project popularity information including a blockchain fork number,
project code change information including commit information with a number of commits,
project issue information including software bug or enhancement relating to the target coin,
branch information including a number of branches for the project of the target coin,
tag information including a number of tags for the project of the target coin, master branch information including a number of pull request for a master branch for the project of the target coin, and smart contract information including an amount of issuance and an amount of transmission relating to the target coin; and a scam determining unit configured to determine whether a target coin is a scam coin by analyzing the acquired project data to check the blockchain based cryptocurrency development attributes of the project of the target coin in terms of data technology, the scam determining unit further including a first determining unit configured to determine whether the target coin is a scam coin on the basis of the first type of project data, wherein the first determining unit is configured to automatically determine and assign a plurality of first verification grades for a first type of judgment items by applying the first type of project data for the target coin to a preset verification guide, using a programmed algorithm based on the preset verification guide;

wherein the preset verification guide includes a plurality of verification grades classified by each numeral value corresponding to each of the first type of judgment items based on the first type of project data;

wherein the first determining unit is further configured to:
select one or more items from the first type of judgment items having one or more verification grades lower than or equal to a predetermined lower threshold grade among the plurality of first verification grades determined for the first type of judgment items; and
determine whether the target coin corresponds to a scam coin on the basis of the selected one or more items from the first type of judgment items; and wherein the first determining unit is configured to determine that the target coin is not a scam coin, upon determination that:
updates of the project of the target coin are more frequent that a predetermined threshold frequency,
the blockchain fork number for the project of the target coin is larger than a predetermined threshold number;
the number of commits is larger than a predetermined threshold number of commit;
a number of issues for the project of the target coin is larger than a predetermined threshold issue number,
the number of branches is larger than a predetermined threshold branch number, and
the number of tags is larger than a predetermined threshold tag number.

2. The system of claim 1, wherein the first determining unit is further configured to calculate a representative verification grade of the target coin on the basis of one or more verification grades for the one or more of the first type of judgment items and determines the target coin as a scam coin when the representative verification grade is a low grade lower than or equal to the predetermined lower threshold grade.

3. The system of claim 1, wherein the data acquisition unit further acquires one or more other types of project data including a second type of project data and a third type of project data, and
the scam determining unit further includes a second determining unit and a third determining unit, wherein the second determining unit is further configured to determine whether the target coin is a scam coin on the basis of the second type of project data and wherein the third determining unit is configured to determine whether the target coin is a scam coin on the basis of the third type of project data.

4. The system of claim 3, wherein the second type of project data and the third type of project data are regarding the target coin, and
upon determination that the target coin is not a scam coin by the first determining unit, the scam determining unit is further configured to analyze the second type of project data or the third type of project data regarding the target coin to verify that the target coin is not a scam coin.

5. The system of claim 3, wherein the second type of project data includes a foundation office item, a foundation employee item, a relationship item between a foundation headquarters and a domestic organization, a representative foundation number item, a representative homepage item, a white paper of the target coin, and an official foundation account number item, and
the third type of project data includes a registered foundation type, a prespecified authentication policy introduction item, a personal information protection item, and a money tracking solution development item.

6. The system of claim 5,
wherein the second determining unit is further configured to correct the determination that the target coin is not a scam coin using second type of project data; and
wherein the second determining unit, in order to correct the determination that the target coin is not a scam coin, calculates a first judgment score on the basis of the second type of project data.

7. The system of claim 6, wherein the second determining unit is further configured to calculate a weighted average of the second type of project data for the target coin to calculate the first judgment score.

8. The system of claim 5,
wherein the third determining unit is further configured to check the determination that the target coin is not a scam coin using third type of project data, wherein the third determining unit is further configured to calculate a second judgment score on the basis of the third type of project data.

9. The system of claim 8, wherein the third determining unit is further configured to calculate a weighted average of the third type of project data for the target coin to calculate the second judgment score.

* * * * *